United States Patent
Ramamurthy et al.

(10) Patent No.: US 11,933,220 B1
(45) Date of Patent: Mar. 19, 2024

(54) SYSTEMS AND METHODS FOR CONTROLLING AN AIR FLOW PATH FOR A PROPULSION SYSTEM AIR INTAKE

(71) Applicant: Pratt & Whitney Canada Corp., Longueuil (CA)

(72) Inventors: Raja Ramamurthy, Montreal (CA); Eray Akcayoz, Cote-Saint-Luc (CA); Mark Cunningham, Montreal (CA); Roberto Marrano, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1 day.

(21) Appl. No.: 17/977,737

(22) Filed: Oct. 31, 2022

(51) Int. Cl.
| | |
|---|---|
| *F02C 7/05* | (2006.01) |
| *F02C 7/042* | (2006.01) |
| *F02C 7/057* | (2006.01) |
| *F02C 9/18* | (2006.01) |

(52) U.S. Cl.
CPC ............... *F02C 7/05* (2013.01); *F02C 7/042* (2013.01); *F02C 7/057* (2013.01); *F02C 9/18* (2013.01); *F05D 2220/323* (2013.01)

(58) Field of Classification Search
CPC .... F02C 7/04; F02C 7/042; F02C 7/05; F02C 7/052; F02C 9/18; F02C 7/057; F05D 2220/323
See application file for complete search history.

(56) References Cited

U.S. PATENT DOCUMENTS

| | | | |
|---|---|---|---|
| 4,844,382 A * | 7/1989 | Raisbeck ............... | B64D 33/02 55/306 |
| 4,972,672 A | 11/1990 | Sanderson | |
| 7,429,018 B1 | 9/2008 | Kechely | |
| 8,425,283 B2 | 4/2013 | Porte | |
| 10,054,050 B2 | 8/2018 | Labrecque | |
| 11,111,028 B2 | 9/2021 | Berens | |
| 11,536,196 B2 * | 12/2022 | Marrano ................. | F02C 7/052 |
| 2008/0072606 A1 * | 3/2008 | Higgins .................. | F02C 7/052 60/39.092 |
| 2016/0053685 A1 * | 2/2016 | Labrecque ............... | F02C 7/045 415/119 |
| 2019/0226403 A1 * | 7/2019 | Burnside ................. | F02C 7/042 |
| 2020/0332711 A1 * | 10/2020 | Owen ..................... | F02C 7/052 |

* cited by examiner

*Primary Examiner* — Todd E Manahan
*Assistant Examiner* — Rodolphe Andre Chabreyrie
(74) *Attorney, Agent, or Firm* — Getz Balich LLC

(57) ABSTRACT

An air intake for an aircraft propulsion system includes an air inlet duct, a core flow duct, a bypass flow duct, a splitter, and a flow control device. The air inlet duct includes an intake inlet and a gas path floor. The core flow duct includes a core flow outlet. The bypass flow duct includes a bypass flow outlet. The bypass flow duct includes the gas path floor. The splitter separates the core flow duct and the bypass flow duct. The flow control device is disposed on a portion of the gas path floor. The flow control device is configured to be selectively positioned to control an air flow path for air flowing through the air inlet duct, the core flow duct, and the bypass flow duct.

12 Claims, 4 Drawing Sheets

SYSTEMS AND METHODS FOR CONTROLLING AN AIR FLOW PATH FOR A PROPULSION SYSTEM AIR INTAKE

TECHNICAL FIELD

This disclosure relates generally to air intakes for aircraft propulsion systems and, more particularly, to systems and methods for controlling an air flow path for an air intake.

BACKGROUND OF THE ART

Some propulsion systems for aircraft may include an air intake configured to separate foreign matter (e.g., dust, debris, ice, etc.) entering the air intake from air which is supplied to an engine of the propulsion system. Various systems and methods are known in the art for controlling intake air flow and separating foreign matter from intake air. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an air intake for an aircraft propulsion system includes an air inlet duct, a core flow duct, a bypass flow duct, a splitter, and a flow control device. The air inlet duct includes an intake inlet and a gas path floor of the air intake. The core flow duct includes a core flow outlet. The core flow duct extends between and to the air inlet duct and the core flow outlet. The bypass flow duct includes a bypass flow outlet. The bypass flow duct extends between and to the air inlet duct and the bypass flow outlet. The bypass flow duct includes the gas path floor. The splitter separates the core flow duct and the bypass flow duct. The flow control device is disposed on a portion of the gas path floor facing the splitter. The flow control device is configured to be selectively positioned to control an air flow path for air flowing through the air inlet duct, the core flow duct, and the bypass flow duct.

In any of the aspects or embodiments described above and herein, the flow control device may include an inflatable boot disposed on the portion of the gas path floor facing the splitter.

In any of the aspects or embodiments described above and herein, the inflatable boot may be selectively positionable in a fully inflated position, a fully deflated position, and a plurality of intermediate positions between the fully inflated position and the fully deflated position.

In any of the aspects or embodiments described above and herein, the flow control device may further include a fluid regulator. The fluid regulator may be configured to be in fluid communication with a pressurized fluid source. The fluid regulator may be configured to direct a pressurized fluid from the pressurized fluid source to the inflatable boot to selectively position the inflatable boot.

In any of the aspects or embodiments described above and herein, the inflatable boot may include a leading edge, a trailing edge, and an air flow surface. The leading edge may be disposed upstream of the splitter. The trailing edge may be disposed downstream of the splitter. The air flow surface may extend from the leading edge to the trailing edge.

In any of the aspects or embodiments described above and herein, the air flow surface may face the splitter.

According to another aspect of the present disclosure, a method for controlling an air flow path of an air intake for an aircraft propulsion system includes: determining an operating condition of the aircraft propulsion system and controlling the air flow path of the air intake by controlling a flow control device to selectively position a device body based on the determined operating condition. The air intake includes a core flow duct, a bypass flow duct, and a splitter separating the core flow duct and the bypass flow duct. The device body is disposed on the bypass flow duct facing the splitter.

In any of the aspects or embodiments described above and herein, the flow control device may include an inflatable boot forming the device body. Selectively positioning the device body may include selectively positioning the inflatable boot. The inflatable boot may be selectively positionable in a fully inflated position, a fully deflated position, and a plurality of intermediate inflation positions between the fully inflated position and the fully deflated position.

In any of the aspects or embodiments described above and herein, selectively positioning the inflatable boot may include directing a pressurized fluid to the inflatable boot to inflate the inflatable boot.

In any of the aspects or embodiments described above and herein, the determined operational condition may be a cruising condition of the aircraft propulsion system and controlling the flow control device may include selectively positioning the inflatable boot in an inflated position based on the cruising condition.

In any of the aspects or embodiments described above and herein, the determined operational condition may be an icing condition of the aircraft propulsion system and controlling the flow control device may include selectively positioning the inflatable boot in the fully deflated position based on the icing condition.

According to another aspect of the present disclosure, a propulsion system for an aircraft includes a gas turbine engine and an air intake. The gas turbine engine forms a core flow path. The air intake includes an air inlet duct, a core flow duct, a bypass flow duct, a splitter, and a flow control device. The air inlet duct includes an intake inlet of the air intake. The core flow duct includes a core flow outlet. The core flow duct extends between and to the air inlet duct and the core flow outlet. The core flow duct is configured to direct air from the air inlet duct to the core flow path through the core flow outlet. The bypass flow duct includes a bypass flow outlet. The bypass flow duct extends between and to the air inlet duct and the bypass flow outlet. The bypass flow duct forms a bypass flow passage from the air inlet duct to the bypass flow outlet. The splitter separates the core flow duct and the bypass flow duct. The air inlet duct and the bypass duct form a gas path floor of the air intake. The gas path floor faces the splitter. The flow control device is disposed the gas path floor.

In any of the aspects or embodiments described above and herein, the flow control device may include an inflatable boot and a fluid regulator. The inflatable boot may be disposed on the gas path floor. The fluid regulator may be in fluid communication with the inflatable boot. The fluid regulator may be configured to selectively position the inflatable boot in a fully inflated position, a fully deflated position, and a plurality of intermediate inflation positions between the fully inflated position and the fully deflated position.

In any of the aspects or embodiments described above and herein, the gas turbine engine may include a compressor forming the core flow path. The fluid regulator may be in fluid communication with the compressor. The fluid regulator may be configured to receive a pressurized fluid from the compressor and direct the pressurized fluid to the inflatable boot.

In any of the aspects or embodiments described above and herein, the propulsion system may further include an engine control system. The engine control system may be in signal communication with the fluid regulator. The engine control system may include a processor in communication with a non-transitory memory storing instructions, which instructions when executed by the processor, may cause the processor to: determine an operating condition of the propulsion system and control the fluid regulator to selectively position the inflatable boot to control an air flow path for air flowing through the air inlet duct, the core flow duct, and the bypass flow duct based on the determined operating condition.

In any of the aspects or embodiments described above and herein, the instructions, when executed by the processor, may further cause the processor to determine the operational condition by identifying that an icing condition is present or absent for the propulsion system.

In any of the aspects or embodiments described above and herein, the inflatable boot may include a leading edge, a trailing edge, and an air flow surface. The leading edge may be disposed upstream of the splitter. The trailing edge may be disposed downstream of the splitter. The air flow surface may extend from the leading edge to the trailing edge.

In any of the aspects or embodiments described above and herein, the air flow surface may have a convex shape from the leading edge to the trailing edge.

In any of the aspects or embodiments described above and herein, the splitter may be positioned radially between the core flow duct and the bypass flow duct with respect to an axial centerline of the propulsion assembly.

In any of the aspects or embodiments described above and herein, the inflatable boot may be positioned at an axial position of the splitter with respect to the axial centerline.

The present disclosure, and all its aspects, embodiments and advantages associated therewith will become more readily apparent in view of the detailed description provided below, including the accompanying drawings.

DETAILED DESCRIPTION

Figure 1:
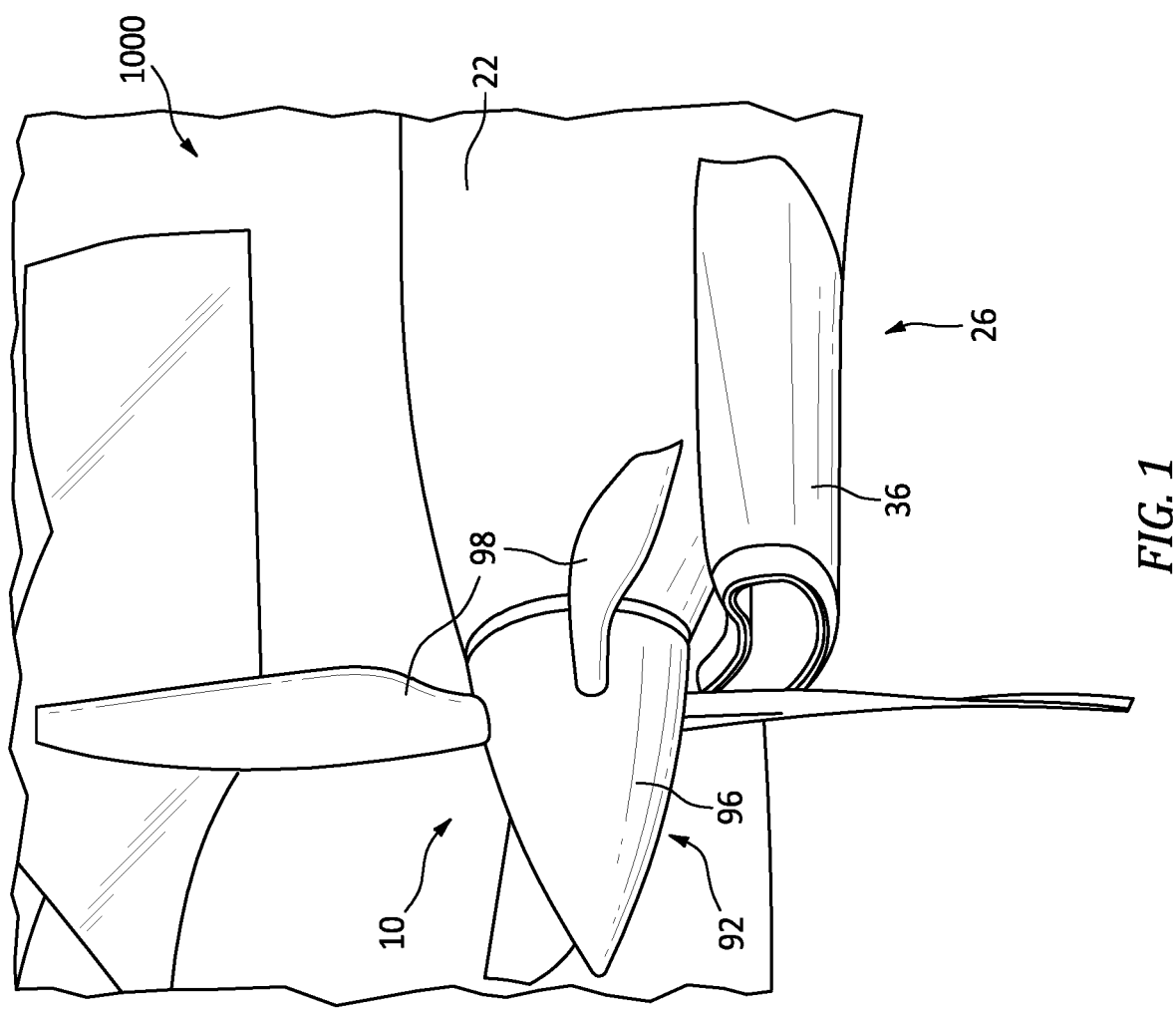
FIG. 1 illustrates a perspective view of a propulsion system for an aircraft, in accordance with one or more embodiments of the present disclosure.
Figure 2:
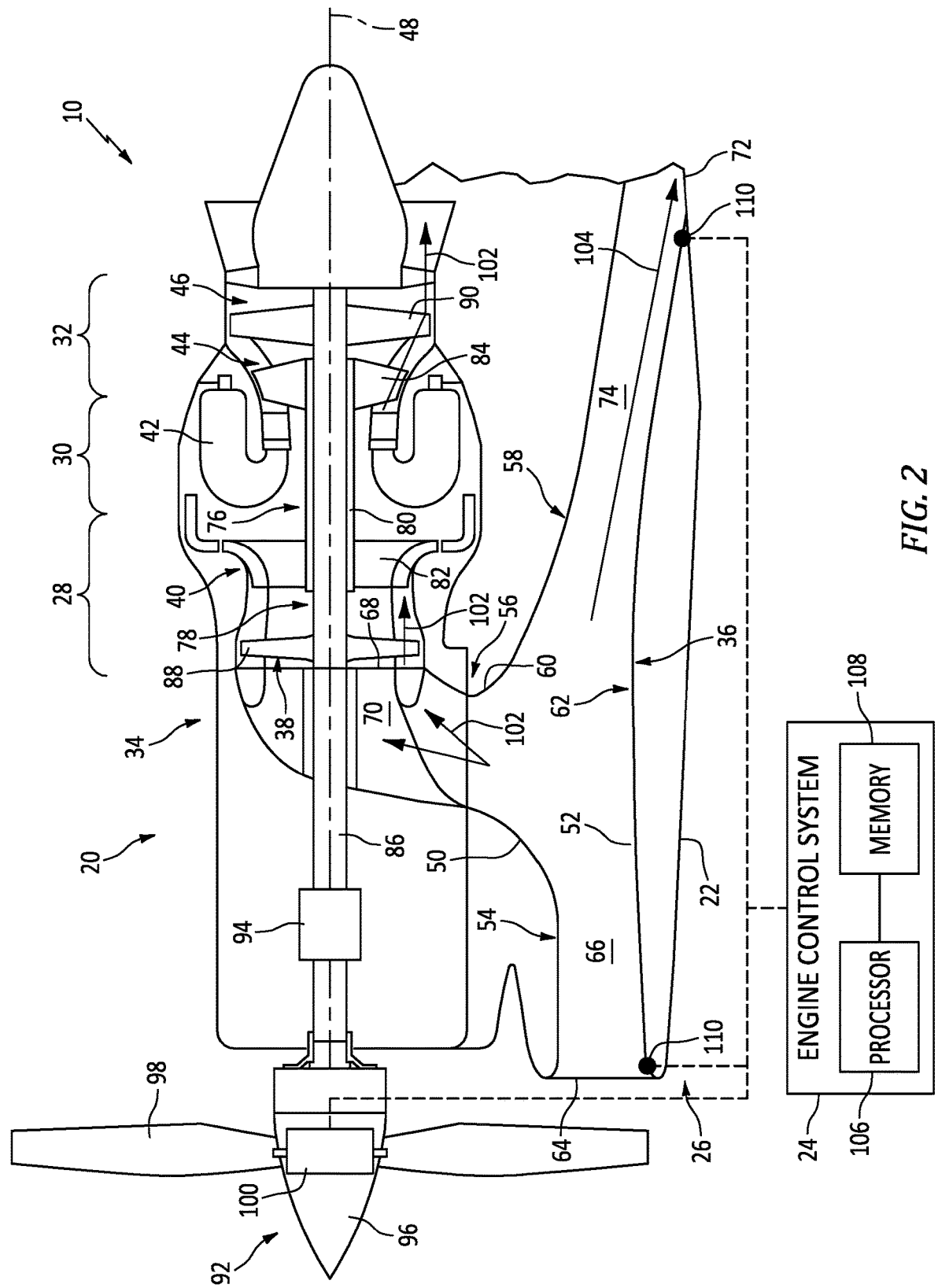
FIG. 2 illustrates a schematic view of the propulsion system of FIG. 1, in accordance with one or more embodiments of the present disclosure.

FIGS. 1 and 2 illustrate a propulsion system 10 for an aircraft 1000. The aircraft propulsion system 10 includes a gas turbine engine 20, a nacelle 22 (e.g., an aircraft propulsion system housing), and an engine control system 24. The propulsion system 10 (e.g., the nacelle 22) may be mounted to or otherwise formed by a portion of the aircraft 1000 such as, but not limited to, a wing or fuselage of the aircraft 1000.

The gas turbine engine 20 of FIGS. 1 and 2 is configured as a turboprop engine. However, the present disclosure is not limited to any particular configuration of gas turbine engine for the propulsion assembly 10, and examples of gas turbine engine configurations for the propulsion system 10 may include, but are not limited to, a turbofan engine, a turbojet engine, a propfan engine, or the like. The gas turbine engine 20 of FIGS. 1 and 2, for example, includes an air inlet section 26, a compressor section 28, a combustor section 30, a turbine section 32, and an engine static structure 34. The air inlet section includes an air intake 36. The compressor section 28 may include a low-pressure compressor (LPC) 38 and a high-pressure compressor (HPC) 40. The combustor section 28 includes an annular combustor 42. The turbine section 32 may include a high-pressure turbine (HPT) 44 and a low-pressure turbine (LPT) 46.

The gas turbine engine 20 sections 28, 30, and 32 of FIG. 2 are arranged sequentially along an axial centerline 48 (e.g., a rotational axis) of the propulsion system 10. The engine static structure 34 may include, for example, one or more engine cases 50 for the gas turbine engine 20. The engine static structure 34 may additionally include cowlings, bearing assemblies, or other structural components of the gas turbine engine 20. The one or more engine cases 50 house and/or structurally support one or more of the engine sections 26, 28, 30, and 32. The engine sections 28, 30, and 32 may be collectively referred to as an "engine core" of the gas turbine engine 20.

The air intake 36 is configured to direct a flow of ambient air into the engine core of the gas turbine engine 20. The air intake 36 of FIGS. 1 and 2 includes an intake body 50. The intake body 50 includes an interior surface 52 forming a series of air passages through the air intake 36. The intake body 50 forms an air inlet duct 54, a core flow duct 56, a bypass flow duct 58, and a core-bypass splitter 60 (hereinafter "splitter"). Each of the air inlet duct 54, the core flow duct 56, the bypass flow duct 58, and the splitter 60 include portions of the interior surface 52. An outer portion (e.g., an outer radial portion) of the interior surface 52 may form a gas path floor 62 of the air intake 36. The gas path floor 62 may be formed by a portion of the interior surface 52 opposite (e.g., radially opposite) the core flow duct 56 and the splitter 60. The gas path floor 62 may extend through the air inlet duct 54 and the bypass flow duct 58. For clarity, the air intake 36 of FIG. 2 may be understood to have an exaggerated size relative to other components of the propulsion system 10. The present disclosure, however, is not limited to any particular size of the air intake 36.

The air inlet duct 54 includes an intake inlet 64 of the air intake 36. The intake inlet 64 forms an opening at (e.g., on, adjacent, or proximate) an upstream end of the air intake 36. The air inlet duct 54 may be disposed outside of the gas turbine engine 20 and may be formed by, disposed within, or otherwise in contact with the nacelle 22. The intake inlet 64 of FIGS. 1 and 2 radially offset from the axial centerline 48. For example, the intake inlet 64 (e.g., the entire intake inlet 64) may be radially offset from the axial centerline 48 in a radial direction (e.g., downwardly), as shown in FIGS. 1 and 2. The intake inlet 64 may also be configured with an axial facing orientation. For example, the intake inlet 64 of FIGS. 1 and 2 faces in an axially-forward direction. The present disclosure, however, is not limited to the particular configuration and orientation of the intake inlet of FIGS. 1 and 2. The interior surface 52 of the air inlet duct 54 surrounds and forms an inlet flow passage 66 through the air inlet duct 54. The inlet flow passage 66 extends from the intake inlet 64 to the core flow duct 56 and the bypass flow duct 58.

The core flow duct 56 includes a core outlet 68 of the air intake 36. The core outlet 68 forms an opening at (e.g., on, adjacent, or proximate) a downstream end of the air intake 36. The core outlet 68 is disposed at (e.g., on, adjacent, or proximate) the compressor section 28 to direct ambient air entering the air intake 36 into the compressor section 28. For example, the core outlet 68 of FIG. 2 is disposed at (e.g., on, adjacent, or proximate) and in fluid communication with an inlet of the low-pressure compressor 38. The interior surface 52 of the core flow duct 56 surrounds and forms a core flow passage 70 through the core flow duct 56. The core flow passage 70 extends from the air inlet duct 54 to the core outlet 68. The core flow duct 56 of FIG. 2 extends in a radially inward direction from the air inlet duct 54 to the core outlet 68. The core outlet 68 and portions of the core flow duct 56 may be configured to form an annular portion of the core flow passage 70 extending circumferentially about (e.g., completely around) the axial centerline 48, as shown in FIG. 2.

The bypass flow duct 58 includes a bypass outlet 72 of the air intake 36. The bypass outlet 72 forms an opening at (e.g., on, adjacent, or proximate) a downstream end of the air intake 36. The bypass flow duct 58 may be disposed outside of the gas turbine engine 20 and may be formed by, disposed within, or otherwise in contact with the nacelle 22. For example, the bypass outlet 72 may be disposed at (e.g., on, adjacent, or proximate) or otherwise formed through an exterior surface of the nacelle 22 to direct air from the air intake 36 to an exterior of the propulsion system 10. The interior surface 52 of the bypass flow duct 58 surrounds and forms a bypass flow passage 74 through the bypass flow duct 58. The bypass flow passage 74 extends from the air inlet duct 54 to the bypass outlet 72. The bypass flow duct 58 of FIG. 2 may extend in an axially aft and a radially outward direction from the air inlet duct 54 to the bypass outlet 72.

The gas turbine engine 20 of FIG. 2 further includes a first rotational assembly 76 (e.g., a high-pressure spool) and a second rotational assembly 78 (e.g., a low-pressure spool). The first rotational assembly 76 and the second rotational assembly 78 are mounted for rotation about the axial centerline 48 relative to the engine static structure 34.

The first rotational assembly 76 includes a first shaft 80, a bladed first compressor rotor 82 for the high-pressure compressor 40, and a bladed first turbine rotor 84 for the high-pressure turbine 44. The first shaft 80 interconnects the bladed first compressor rotor 82 and the bladed first turbine rotor 84. The second rotational assembly 78 includes a second shaft 86, a bladed second compressor rotor 88 for the low-pressure compressor 38, a bladed second turbine rotor for the low-pressure turbine 46, and a propeller 92. The second shaft 86 interconnects the bladed second compressor rotor 88 and the bladed second turbine rotor 90. The second shaft 86 may be connected to the propeller 92 by one or more speed-reducing gear assemblies 94 to drive the propeller 92 at a reduced rotational speed relative to the second shaft 86. Alternatively, the second shaft 86 may directly interconnect the propeller 92 with the bladed second compressor rotor 88 and the bladed second turbine rotor 90. The combustor 42 of FIG. 2 is disposed between the bladed first compressor rotor 82 and the bladed first turbine rotor 84 along the axial centerline 48.

The propeller 92 of FIGS. 1 and 2 includes a hub 96 and a plurality of propeller blades 98. The propeller blades 98 are mounted to the hub 96. The propeller blades 98 of FIGS. 1 and 2 are circumferentially distributed about the hub 96 relative to the axial centerline 48. However, it should be understood that the propeller 92 may be configured for rotation about a rotational axis which is different than the axial centerline 48 and, therefore, the propeller blades 98 may be circumferentially distributed about this different rotational axis. The propeller blades 98 extend radially outward from the hub 96. As shown in FIGS. 1 and 2, the propeller blades 98 may extend radially outward from the hub 96 such that the propeller blades 98 radially overlap all or a portion of the intake inlet 64. The propeller blades 98 may be additionally or alternatively be disposed axially forward of the intake inlet 64. In some embodiments, each of the propeller blades 98 may be configured to rotate about a lengthwise axis of the propeller blade 98 to vary a pitch of the propeller blade 98. For example, as shown in FIG. 2, the propulsion assembly 10 or its propeller 92 may include an actuation system 100 configured to effect rotation of the propeller blades 98. The actuation system 100 may be configured as a mechanical actuation system, an electro-mechanical actuation system, a hydraulic actuation system, a pneumatic actuation system, or another other suitable configuration for effecting rotation of the propeller blades 98.

The nacelle 22 houses the gas turbine engine 20 and forms and aerodynamic cover for the propulsion system 10. The nacelle 22 may extend circumferentially about (e.g., completely around) the axial centerline 48. The nacelle 22 may surround and/or support portions of the air intake 36.

During operation of the propulsion system 10 of FIGS. 1 and 2, ambient air enters the propulsion system 10 through the air intake 36 and is directed into a core flow path 102 through core flow passage 70 and a bypass flow path 104 through the bypass flow passage 74. The core flow path 102 extends axially from the core outlet 68 along the axial centerline 48 within the gas turbine engine 20. More particularly, the core flow path 102 extends axially through the gas turbine engine 20 sections 28, 30, 32 of FIG. 2. The air within the core flow path 102 may be referred to as "core air." The core air is compressed by the bladed second compressor rotor 88 and the bladed first compressor rotor 82 and directed into a combustion chamber of the combustor 42. Fuel is injected into the combustion chamber and mixed with the compressed core air to provide a fuel-air mixture. This fuel-air mixture is ignited and combustion products thereof, which may be referred to as "core combustion gas," flow through and sequentially cause the bladed first turbine rotor 84 and the bladed second turbine rotor 90 to rotate. The rotation of the bladed first turbine rotor 84 and the bladed second turbine rotor 90 respectively drive rotation of the first rotational assembly 76 and the second rotational assembly 78. Rotation of the second rotational assembly 78 further drives rotation of the propeller 92 to provide propulsion (e.g., thrust) for the aircraft 1000. Rotation of the propeller 92 in proximity to the intake inlet 68 may induce a circumferential component to a flow direction of the ambient air entering the intake inlet 68, which influence may be referred to as "propeller wash" or "prop wash." The bypass flow path 104 extends through the bypass flow passage 74 from the air inlet duct 54 to the bypass outlet 72. The air within the bypass flow path 104 may be referred to as "bypass air."

The engine control system 24 of FIG. 2 includes a processor 106 and memory 108. The memory 108 is in signal communication with the processor 106. The processor 106 may include any type of computing device, computational circuit, or any type of process or processing circuit capable of executing a series of instructions that are stored in the memory 108, thereby causing the processor 106 to perform or control one or more steps or other processes. The processor 106 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 108 may represent one or more algorithms for controlling aspects of the propulsion system 10, and the stored instructions are not limited to any particular form (e.g., program files, system data, buffers, drivers, utilities, system programs, etc.) provided they can be executed by the processor 106. The memory 108 may be a non-transitory computer readable storage medium configured to store instructions that when executed by one or more processors, cause the one or more processors to perform or cause the performance of certain functions. The memory 108 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the engine control system 24 may be achieved via the use of hardware, software, firmware, or any combination thereof. The engine control system 24 may also include input and output devices (e.g., keyboards, buttons, switches, touch screens, video monitors, sensor readouts, data ports, etc.) that enable the operator to input instructions, receive data, etc. The engine control system 24 may be located within the propulsion system 10 or may be located on the aircraft 1000 (see FIG. 1) on which the propulsion system 10 is installed.

The engine control system 24 may form or otherwise be part of an electronic engine controller (EEC) for the propulsion system 10. The EEC may control operating parameters of the gas turbine engine 20 including, but not limited to, fuel flow, stator vane position (e.g., variable compressor inlet guide vane (IGV) position), compressor air bleed valve position, propeller blade 94 pitch, etc. so as to control an engine power and/or thrust of the gas turbine engine 20. In some embodiments, the EEC may be part of a full authority digital engine control (FADEC) system for the propulsion system 10.

The engine control system 24 may be configured to receive data associated with operation of the gas turbine engine 20. The data may include operational parameters (e.g., pressure, temperature, fuel flow, rotation speed, shaft torque, etc.) for the gas turbine engine 20. The engine control system 24 may be configured to measure or otherwise obtain operational parameters for the propeller 92 such as, but not limited to, propeller 92 rotation speed and/or pitch positions of the propeller blades 98. For example, the engine control system 24 may be in communication (e.g., signal communication) with the actuation system 100 to receive one or more operational parameters for the propeller 92. The engine control system 24 may include and be in communication (e.g., signal communication) with one or more sensors 110 distributed throughout the gas turbine engine 20. The sensors 110 may include, but are not limited to, one or more of the following exemplary sensors: an air intake pressure sensor, an air intake flow sensor, an air intake temperature sensor, and the like. The sensors 110 may be disposed at one or more locations at (e.g., on, adjacent, or proximate) or within the air intake 36. Additional or alternative sensors 110 (e.g., air pressure sensors, air temperature sensors, etc.) may be disposed at other locations of the aircraft 1000 or its propulsion system 10. The sensors 110 may be used, for example, to determine or otherwise identify operational conditions of the air intake 36 such as icing conditions, air flow conditions, and the like.

During operation of the propulsion system 10, foreign matter such as, but not limited to, water, ice particles, sand, hail, and other debris may enter the air intake 36 with the ambient air. Additionally, ice may form or otherwise accumulate on surfaces of the intake body 50, such as the interior surface 52, and may subsequently be dislodged and carried by air flowing through the air intake 36. If ingested into the engine core, this foreign matter could cause damage to the gas turbine engine 20. The configuration of the air intake 36 may facilitate inertial separation of foreign matter entering the air intake 36 to prevent the foreign matter from being directed into the engine core. For example, foreign matter entering the intake inlet 64 may be unable to be carried by air flow into the core flow passage 66 (e.g., the foreign matter may be unable to make the turn into the core flow passage 66) and the foreign matter may instead be directed into the bypass flow passage 70 and exhausted from the propulsion assembly 10. As an example, the gas path floor 62 of FIG. 2 includes a relatively flat portion of the interior surface 52 from the intake inlet 64 into the bypass flow duct 58. This relatively flat gas path floor 62 may facilitate a reduction in the likelihood of ice accumulation within the air intake 36 and foreign matter ingestion into the engine core. However, the relatively flat gas path floor 62 may also contribute to flow separation of air flowing into and through the bypass flow duct 58, thereby contributing to pressure loss and flow distortion within the air intake 36 (e.g., reduced air intake efficiency).

Figure 4:
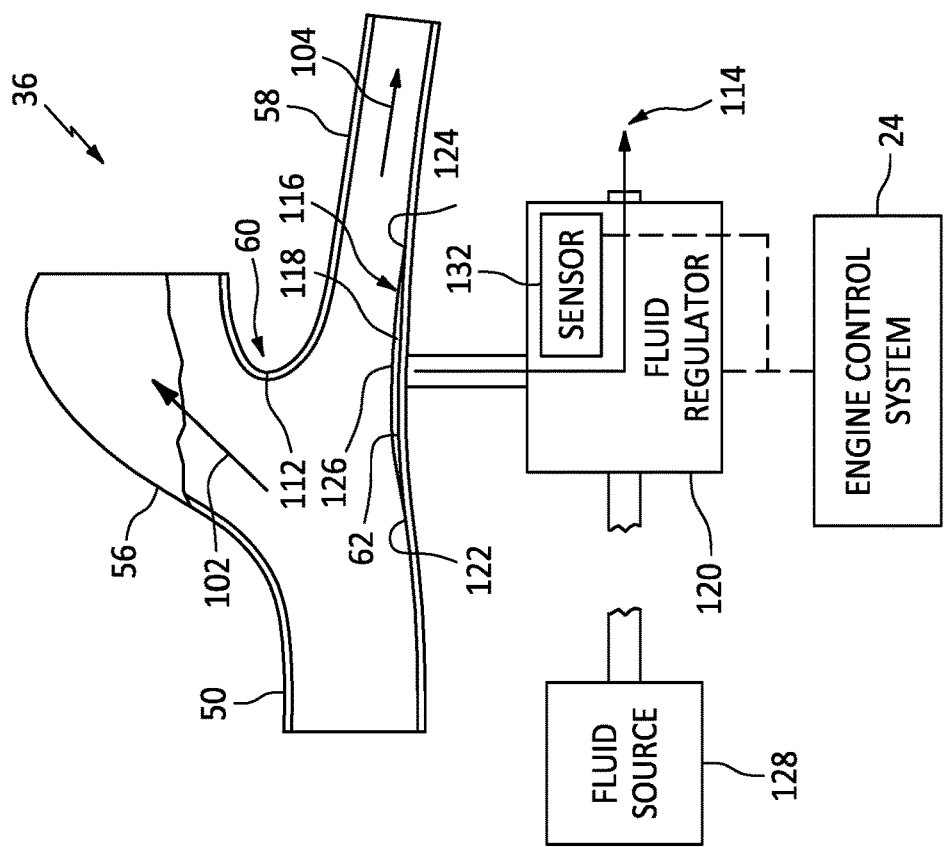
FIG. 4 illustrates another side, cutaway view of a portion of an air intake including a flow control device, in accordance with one or more embodiments of the present disclosure.
Figure 3:
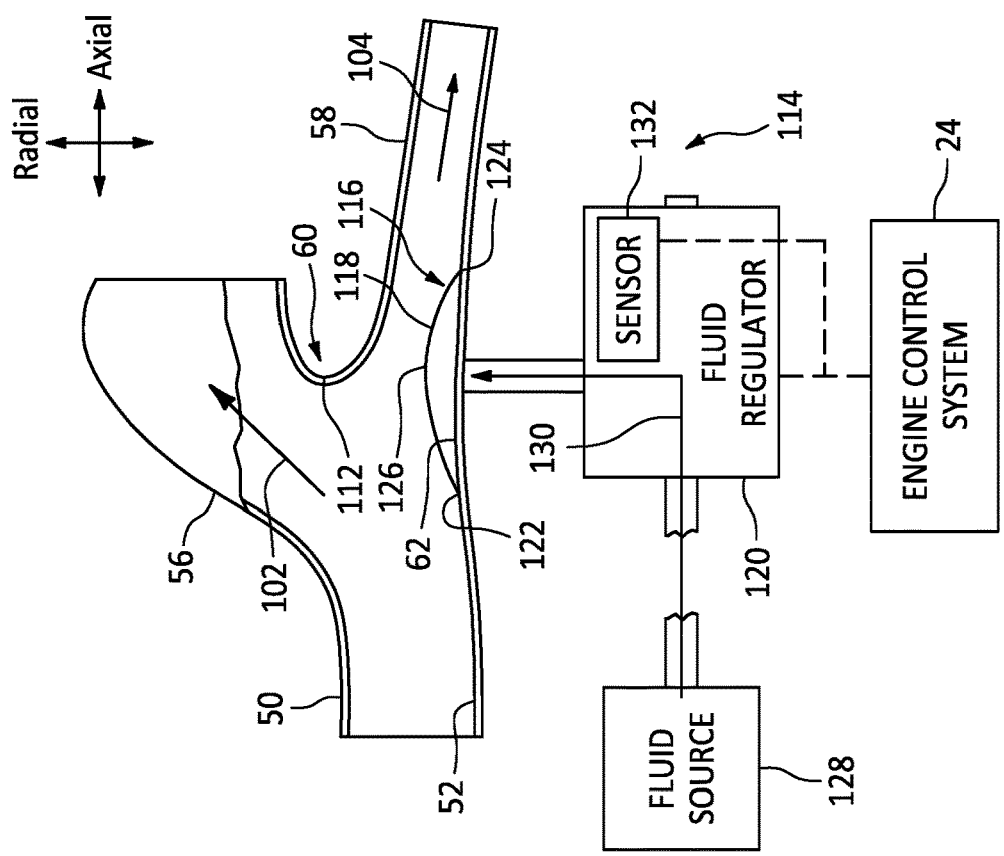
FIG. 3 illustrates a side, cutaway view of a portion of an air intake including a flow control device, in accordance with one or more embodiments of the present disclosure.

Referring to FIGS. 3 and 4, the splitter 60 of the air intake 36 of FIGS. 3 and 4 is positioned between (e.g., radially between) the core flow duct 56 and the bypass flow duct 58 to separate the core flow path 102 from the bypass flow path 104. For example, the splitter 60 of FIGS. 3 and 4 forms a radially outer boundary of the core flow duct 56 and a radially inner boundary of the bypass flow duct 58. The splitter 60 of FIGS. 3 and 4 includes a leading edge 112 (e.g., an axially forward-most edge) of the intake body 50 between the core flow duct 56 and the bypass flow duct 58.

The air intake 36 of FIGS. 3 and 4 includes a flow control device 114. The flow control device 114 includes a device body 116 disposed on the gas path floor 62. For example, the device body 116 may be positioned on the gas path floor 62 at (e.g., on, adjacent, or proximate) an axial position of the splitter 60 (e.g., the leading edge 112). The device body 116 is configured to be positioned, deformed, or otherwise varied in shape and/or orientation so as to control (e.g., selectively control) an air flow path for air flowing through the air inlet duct 54, the core flow duct 56, and/or the bypass flow duct 58. It should be understood that the flow control device 114 of the present disclosure is not limited to the particular flow control device 114 configuration illustrated in FIGS. 3 and 4 provided the flow control device 114 is configured to be positioned, deformed, or otherwise varied in shape and/or orientation so as to modify a shape or geometry of the gas path floor 62.

The flow control device 114 of FIGS. 3 and 4 includes an inflatable boot 118 and a fluid regulator 120. The inflatable boot 118 may form all or a portion of the device body 116. The inflatable boot 118 of FIGS. 3 and 4 is mounted to or otherwise positioned on the gas path floor 62 at (e.g., on, adjacent, or proximate) an axial position of the splitter 60 (e.g., the leading edge 112). The inflatable boot 118 may be formed by or may otherwise include a flexible material such as, but not limited to, rubber and/or another suitable elastomeric material.

The inflatable boot 118 of FIGS. 3 and 4 includes a leading edge 122, a trailing edge 124, and an air flow surface 126. The leading edge 122 may be an upstream-most portion of the inflatable boot 118, with respect to air flow through the air intake 36. The leading edge 124 may be disposed upstream of (e.g., axially forward of) the splitter 60 (e.g., the leading edge 112). The trailing edge 124 is disposed downstream of the leading edge 122. The trailing edge 124 may be a downstream-most portion of the inflatable boot 118. The trailing edge 124 may be disposed downstream of (e.g., axially aft of) the splitter 60 (e.g., the leading edge 112). The present disclosure is not limited to the positions of the leading edge 122 and the trailing edge 124 of FIGS. 3 and 4 relative to the inflatable boot 118. For example, in some embodiments, the entire inflatable boot 118 may be upstream of the splitter 60 while, in some other embodiments, the entire inflatable boot 118 may be downstream of the splitter 60. Each of the leading edge 122 and the trailing edge 124 may be disposed at (e.g., on, adjacent, or proximate) the interior surface 52 (e.g., the gas path floor 62). The air flow surface 126 may extend from the leading edge 122 to the trailing edge 124. The air flow surface 126 may face the splitter 60. The air flow surface 126 may form a convex or substantially convex shape of the inflatable boot 118 from the leading edge 122 to the trailing edge 124.

The fluid regulator 120 is in fluid communication (e.g., using one or more suitable conduits) with the inflatable boot 118. The fluid regulator 120 is configured to direct a fluid into the inflatable boot 118 to increase a size of (e.g., inflate) the inflatable boot 118. Similarly, the fluid regulator 120 is configured to direct a fluid out of the inflatable boot 118 to decrease a size of (e.g., deflate) the inflatable boot 118. FIG. 3 illustrates the inflatable boot 118 in an inflated position. FIG. 4 illustrates the inflatable boot 118 in a deflated position. The fluid regulator 120 may include one or more components such as, but not limited to, flow control valves (e.g., spring-loaded control valves), pressure-relief valves, fluid vents, and the like so as to direct and control a supply of fluid to or from the inflatable boot 118. The present disclosure, however, is not limited to any particular configuration of the fluid regulator 120. The fluid regulator 120 is in fluid communication (e.g., using one or more suitable conduits) with a pressurized fluid source 128. The fluid regulator 120 is configured to receive a pressurized fluid 130 from the pressurized fluid source 128. The pressurized fluid source 128 may include, for example, one of the low-pressure compressor 38 or the high-pressure compressor 40 (see FIG. 2). For example, the low-pressure compressor 38 or the high-pressure compressor 40 may be configured to supply pressurized bleed air (e.g., from an intermediate stage or compressor outlet) to the fluid regulator 120. The fluid regulator 120 may include a pressure sensor 132 configured to measure a pressure of the fluid in or supplied to the inflatable boot 118. The fluid regulator 120 and/or its pressure sensor 132 may be in communication (e.g., signal communication) with the engine control system 24. The inflatable boot 118 may be selectively positionable by the fluid regulator 120 in a fully inflated position, a fully deflated position, and a plurality of inflated positions between the fully inflated position and the fully deflated position.

Figure 5:
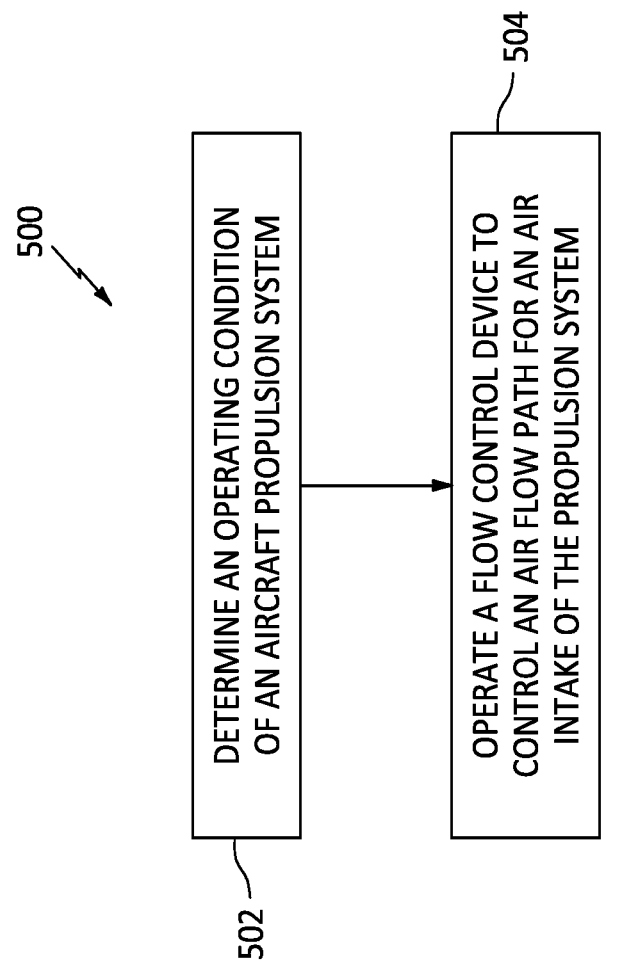
FIG. 5 illustrates a block diagram of a method for controlling an air flow path for an air intake of an aircraft propulsion system, in accordance with one or more embodiments of the present disclosure.

Referring to FIGS. 3-5, a Method 500 for controlling an air flow path for an air intake of an aircraft propulsion system is provided. FIG. 5 illustrates a flowchart for the Method 500. The Method 500 may be performed for the propulsion system 10 and its air intake 36, as described herein. The engine control system 24 may be used to execute or control one or more steps of the Method 500. For example, the processor 106 may execute instructions stored in memory 108, thereby causing the engine control system 24 and/or its processor 106 to execute or otherwise control one or more steps of the Method 500. However, while the Method 500 may be described herein with respect to the propulsion system 10, the air intake 36, and the engine control system 24, the present disclosure Method 500 is not limited to use with the propulsion system 10, the air intake 36, and the engine control system 24 described herein. Unless otherwise noted herein, it should be understood that the steps of Method 500 are not required to be performed in the specific sequence in which they are discussed below and, in some embodiments, the steps of Method 500 may be performed separately or simultaneously.

In Step 502, an operating condition of the propulsion system 10 is determined or otherwise obtained by the engine control system 24. The operational condition of the propulsion system 10 may include, for example, an operational state (e.g., cruise, takeoff, landing, etc.) and/or an atmospheric state (e.g., ambient air temperature, altitude, ambient air pressure, etc.). The atmospheric state and/or the operational state for the propulsion system 10 may be determining using, for example, sensor data from the sensors 110 and/or other sensor data and operational parameters of the aircraft 1000 (see FIG. 1) or its propulsion system 10. The identified operational state and/or the atmospheric state may be used by the engine control system 24 to determine that an icing condition exists (e.g., that the icing condition is present or absent) for the propulsion system 10. An icing condition for the propulsion system 10 may represent an increased likelihood of ice ingestion into the air intake 36 and/or ice formation on surfaces (e.g., the interior surface 52) of the air intake 36.

In Step 504, the flow control device 114 may be operated to control a position of the device body 116. The engine control system 24 may operate or otherwise control the flow control device 114 based on the determined operational condition of the propulsion system 10 (see Step 502). The engine control system 24 may control the fluid regulator 120 to direct the pressurized fluid 130 to the inflatable boot 118 to inflate the inflatable boot 118, thereby increasing a size of the inflatable boot 118. For example, the engine control system 24 may control the fluid regulator 120 to increase a fluid pressure of the inflatable boot 118 (e.g., as measured by the pressure sensor 132) to a predetermined pressure value, which predetermined pressure value may correspond to a selected inflation position for the inflatable boot 118. The engine control system 24 may control the fluid regulator 120 to direct the pressurized fluid 130 out of the inflatable boot 118 to deflate the inflatable boot 118, thereby decreasing a size of the inflatable boot 118. The engine control system 24 may, therefore, control the fluid regulator 120 to selectively position the inflatable boot 118 in a fully inflated position, a fully deflated position, and a plurality of intermediate inflation positions.

The engine control system 24 may control the flow control device 114 to facilitate improved air intake 36 performance and separation of foreign matter. For example, during a condition of the propulsion system 10 in which the likelihood of ice ingestion or ice formation may be relatively low for the air intake 36 such as, but not limited to, a cruising condition, the engine control system 24 may control the flow control device 114 to inflate the inflatable boot 118 (see FIG. 3) to facilitate a reduction in flow separation, total pressure loss, and inlet distortion of air flowing into and through the bypass flow duct 58, thereby improving air intake 36 performance during the cruising condition. In this partially or fully inflated position of the inflatable boot 118, the inflatable boot 118 may still accommodate separation of foreign matter through the bypass flow duct 58. The inflatable boot 118 may be sufficiently flexible such that the impact energy of relatively large foreign matter may deflate or momentarily deform the inflatable boot 118 allowing the relatively large foreign matter to be directed past the inflatable boot 118 and exhausted from the propulsion system 10 through the bypass outlet 72. In contrast, during a condition of the propulsion system in which the likelihood of ice ingestion or ice formation may be relatively high for the air intake 36 such as, but not limited to, a takeoff condition, a climbing condition, a landing condition, and/or an icing condition, the engine control system 24 may control the flow control device 114 to deflate the inflatable boot 118 (see FIG. 4) to facilitate the separation of foreign matter into the bypass flow duct 58 and away from the core flow duct 56, for example, by flattening the gas path floor 62.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. An air intake for an aircraft propulsion system, the air intake comprising:
   an air inlet duct, the air inlet duct including an intake inlet and a gas path floor of the air intake;
   a core flow duct, the core flow duct including a core flow outlet, the core flow duct extending between and to the air inlet duct and the core flow outlet;
   a bypass flow duct, the bypass flow duct including a bypass flow outlet, the bypass flow duct extending between and to the air inlet duct and the bypass flow outlet, the bypass flow duct including the gas path floor;
   a splitter separating the core flow duct and the bypass flow duct;
   a flow control device including an inflatable boot and a fluid regulator, the inflatable boot is disposed on a portion of the gas path floor facing the splitter, the inflatable boot is selectively positionable in a fully inflated position, a fully deflated position, and a plurality of intermediate positions between the fully inflated position and the fully deflated position to control an air flow path for air flowing through the air inlet duct, the core flow duct, and the bypass flow duct, and the fluid regulator is connected in fluid communication with a pressurized fluid source to direct a pressurized fluid from the pressurized fluid source to the inflatable boot to selectively position the inflatable boot; and
   an engine control system, the engine control system in signal communication with the fluid regulator, the engine control system including a processor in communication with a non-transitory memory storying instructions, which instructions when executed by the processor, cause the processor to:
      identify a cruising condition of the aircraft propulsion system; and
      control the fluid regulator to selectively position the inflatable boot in the fully inflated position based on the identified cruising condition.

2. The air intake of claim 1, wherein the inflatable boot includes a leading edge, a trailing edge, and an air flow surface, the leading edge disposed upstream of the splitter, the trailing edge disposed downstream of the splitter, the air flow surface extending from the leading edge to the trailing edge.

3. The air intake of claim 2, wherein the air flow surface faces the splitter.

4. A method for controlling an air flow path of an air intake for an aircraft propulsion system, the method comprising:

determining an cruising condition of the aircraft propulsion system; and controlling the air flow path of the air intake by controlling an inflatable boot of a flow control device to selectively position a device body of the inflatable boot in a fully inflated position based on the determined cruising condition, the air intake including a core flow duct, a bypass flow duct, and a splitter separating the core flow duct and the bypass flow duct, the device body disposed on the bypass flow duct facing the splitter.

5. The method of claim 4, wherein the inflatable boot is selectively positionable in the fully inflated position, a fully deflated position, and a plurality of intermediate inflation positions between the fully inflated position and the fully deflated position.

6. The method of claim 5, wherein selectively positioning the inflatable boot includes directing a pressurized fluid to the inflatable boot to inflate the inflatable boot.

7. A propulsion system for an aircraft, the propulsion system comprising:

a gas turbine engine forming a core flow path;

an air intake, the air intake including an air inlet duct, a core flow duct, a bypass flow duct, a splitter, and a flow control device, the air inlet duct including an intake inlet of the air intake, the core flow duct including a core flow outlet, the core flow duct extending between and to the air inlet duct and the core flow outlet; the core flow duct configured to direct air from the air inlet duct to the core flow path through the core flow outlet, the bypass flow duct includes a bypass flow outlet, the bypass flow duct extending between and to the air inlet duct and the bypass flow outlet, the bypass flow duct forming a bypass flow passage from the air inlet duct to the bypass flow outlet, the splitter separating the core flow duct and the bypass flow duct, the air inlet duct and the bypass duct forming a gas path floor of the air intake, the gas path floor facing the splitter, the flow control device includes an inflatable boot and a fluid regulator, the inflatable boot is disposed the gas path floor, the fluid regulator in fluid communication with the inflatable boot, the fluid regulator configured to selectively position the inflatable boot in a fully inflated position, a fully deflated position, and a plurality of intermediate inflation positions between the fully inflated position and the fully deflated position; and an engine control system, the engine control system in signal communication with the fluid regulatory, the engine control system including a processor in communication with a non-transitory memory storing instructions, which instructions when executed by the processor, cause the processor to:

identify that an icing condition is present or absent for the propulsion system; and control the fluid regulator to selectively position the inflatable boot in the fully deflated position to control an air flow path for air flowing through the air inlet duct, the core flow duct, and the bypass flow duct based on identification that the icing condition is present for the propulsion system.

8. The propulsion system of claim 7, wherein the gas turbine engine includes a compressor forming the core flow path, the fluid regulator in fluid communication with the compressor, the fluid regulator configured to receive a pressurized fluid from the compressor and direct the pressurized fluid to the inflatable boot.

9. The propulsion system of claim 7, wherein the inflatable boot includes a leading edge, a trailing edge, and an air flow surface, the leading edge disposed upstream of the splitter, the trailing edge disposed downstream of the splitter, the air flow surface extending from the leading edge to the trailing edge.

10. The propulsion system of claim 9, wherein the air flow surface has a convex shape from the leading edge to the trailing edge.

11. The propulsion system of claim 7, wherein the splitter is positioned radially between the core flow duct and the bypass flow duct with respect to an axial centerline of the propulsion assembly.

12. The propulsion system of claim 11, wherein the inflatable boot is positioned at an axial position of the splitter with respect to the axial centerline.

* * * * *